(12) United States Patent
Mountney et al.

(10) Patent No.: US 8,503,990 B2
(45) Date of Patent: *Aug. 6, 2013

(54) METHOD AND SYSTEM FOR CONTROLLING THE OPERATION OF MOVABLE WIRELESS NETWORKS

(75) Inventors: Scott A. Mountney, Redmond, WA (US); Mike D. Verstegen, Redmond, WA (US); Kevin J. Niemi, Issaquah, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 855 days.

This patent is subject to a terminal disclaimer.

(21) Appl. No.: 11/877,795

(22) Filed: Oct. 24, 2007

(65) Prior Publication Data

US 2008/0045222 A1    Feb. 21, 2008

Related U.S. Application Data

(63) Continuation of application No. 10/938,569, filed on Sep. 13, 2004, now Pat. No. 7,324,813.

(60) Provisional application No. 60/549,920, filed on Mar. 5, 2004.

(51) Int. Cl.
 *H04M 3/42* (2006.01)
(52) U.S. Cl.
 USPC ........ 455/414.1; 455/443; 455/448; 455/454; 370/338

(58) Field of Classification Search
 USPC .............................. 455/414.1, 443, 448, 454
 See application file for complete search history.

(56) References Cited

U.S. PATENT DOCUMENTS

| 5,337,344 | A | 8/1994 | Alvesalo |
| 6,819,919 | B1 | 11/2004 | Tanaka |
| 6,856,803 | B1 | 2/2005 | Gross et al. |
| 7,286,503 | B1 | 10/2007 | Clarke et al. |
| 7,574,217 | B1 * | 8/2009 | Leung et al. ............... 455/456.1 |
| 2002/0045444 | A1 * | 4/2002 | Usher et al. .................... 455/422 |
| 2003/0236106 | A1 | 12/2003 | Master et al. |
| 2004/0142658 | A1 * | 7/2004 | McKenna et al. ............ 455/11.1 |
| 2004/0242149 | A1 | 12/2004 | Luneau |
| 2005/0057370 | A1 | 3/2005 | Warrior et al. |
| 2009/0023458 | A1 | 1/2009 | Mountney |

FOREIGN PATENT DOCUMENTS

WO    WO 01/15338 A1    3/2001

* cited by examiner

*Primary Examiner* — Wayne Cai
*Assistant Examiner* — Chuck Huynh
(74) *Attorney, Agent, or Firm* — Abel Law Group, LLP (57) ABSTRACT

The invention can provide a movable wireless network that is capable of operating in a multiple network environment. The movable wireless network has a coverage area and includes a detector that detects a network event when the coverage area of the movable wireless network overlaps with a coverage area of another wireless network. The invention can further include a controller that changes an operational state of the movable wireless network when the detector detects the network event so that the movable wireless network is able to operate within the coverage area of the other wireless network.

29 Claims, 5 Drawing Sheets

| LOCATION | STATIONARY NETWORK ID | MOBILE NETWORK CODE (MNC) | MOBILE COUNTRY CODE (MCC) | OPERATIONAL STATES | | |
|---|---|---|---|---|---|---|
| | | | | FREQUENCIES | POWER | ... |
| REGION 1 | A | 010 | 100 | BAND A | X | |
| REGION 2 | B | 020 | 200 | BAND B | Y | |
| REGION 3 | C | 030 | 300 | BAND C | Z | |
| REGION 4 | D | 040 | 400 | BAND D | W | |
| ⋮ | ⋮ | ⋮ | ⋮ | ⋮ | ⋮ | |

METHOD AND SYSTEM FOR CONTROLLING THE OPERATION OF MOVABLE WIRELESS NETWORKS

CROSS-REFERENCE TO RELATED APPLICATION

This application is a continuation of U.S. patent application Ser. No. 10/938,569 filed on Sep. 13, 2004, which claims priority to U.S. Provisional Application Ser. No. 60/549,920, filed Mar. 5, 2004.

BACKGROUND OF THE INVENTION

1. Field of the Invention

This invention relates to a method and system for controlling the operation of movable wireless networks for operation in multiple network environments.

2. Description of Related Art

Currently, non-stationary or movable wireless network systems exist that are based within movable objects, such as ships, trains, aircraft, buses, and the like. Accordingly, as the movable object moves, so does a coverage area of the movable wireless network.

As a result of their changeable position, movable wireless networks can come into contact with stationary or other movable wireless networks. For example, the coverage area of the movable wireless network may overlap with the coverage area of a stationary network. When such an event happens, the respective wireless networks can undesirably interfere with each other, and thus result in interrupted service to their respective wireless network users. For example, the movable wireless network of a cruise ship may come into contact with a land-based stationary wireless network when the ship pulls into a port, or simply comes within close proximity to land. Since resources, such as transmitter power and frequency are subject to local and international rules, laws and agreements, the use of the movable wireless network can be restricted. Accordingly, when this event occurs, the movable wireless network can be shutdown to avoid potential interference between the movable and stationary wireless networks, as well as violation of any local rules or regulations, and the movable wireless network users aboard the ship would then switch from the movable wireless network to communicate through the land-based stationary wireless network.

One technique of avoiding interference between a movable wireless network and stationary wireless network is described in PCT publication WO 01/15338. The WO 01/15338 publication teaches that an operator of a movable wireless station will generally not have a license to operate within the territory covered by a fixed base station, and may only be permitted to operate in international waters. Accordingly, the system taught in WO 01/15338 includes a movable base station that is capable of detecting whether the movable base station is within the range of a fixed base station, such as a land-based stationary wireless network. In order to avoid interference with the fixed base station, when the movable wireless base station detects that it is within a particular range of a fixed base station, the movable wireless base station is shut down or the power of the movable wireless base station is reduced. This has the effect of avoiding interference between the wireless networks by having the movable wireless network defer to the fixed network whenever the movable wireless network determines that it is within a particular range of the fixed base station.

SUMMARY OF THE INVENTION

The invention can provide a movable wireless network having a detector that senses a network event caused by a proximity of the movable wireless network to another wireless network. The invention can also include a controller that changes an operational state of the movable wireless network based on the network event so that the movable wireless network is able to operate with the other wireless network.

The invention can also provide a movable wireless network having a coverage area that includes a detector that detects a network event when the coverage area of the movable wireless network overlaps with a coverage area of another wireless network. The invention can further include a controller that changes an operational state of the movable wireless network when the detector detects the network event so that the movable wireless network is able to operate within the coverage area of the other wireless network.

A mobile network controller can continuously monitor a movable wireless network to determine whether a network event requires the movable wireless network to change an operational state. A network event can include situations where the movable wireless network moves into proximity with another network (movable or stationary) or when the movable wireless network interferes with another network (movable or stationary). A network event can be detected by a sensor, such as a position sensor, that can determine the position of the movable network relative to known stationary wireless networks. Further, a network event can be detected by a sensor that monitors the relevant frequency spectrum and measures frequency use and signal strength within the movable network or area surrounding the movable network to determine possible interference or overlap between the movable wireless network and another wireless network (movable or stationary).

Upon detection of a network event, the controller can change the operational state of a movable wireless network, such as changing an output power level (including shutting down) and transmission frequencies to minimize or avoid interfering with the stationary wireless network. Additionally, other operational states that the mobile network controller can change include codes of the system, such as mobile network codes (MNC) and mobile country codes (MCC) to correspond to a particular area of operation, a legal entity's license, or a country's jurisdiction.

These and other features and advantages of various exemplary embodiments of systems and methods according to this invention are described in, or are apparent from, the following detailed description of various exemplary embodiments of the systems and methods according to this invention.

BRIEF DESCRIPTION OF THE DRAWINGS

Various exemplary embodiments of this invention will be described in detail, with reference to the following figures, wherein like numerals represent like elements, and wherein.

DETAILED DESCRIPTION OF PREFERRED EMBODIMENTS

Figure 1:
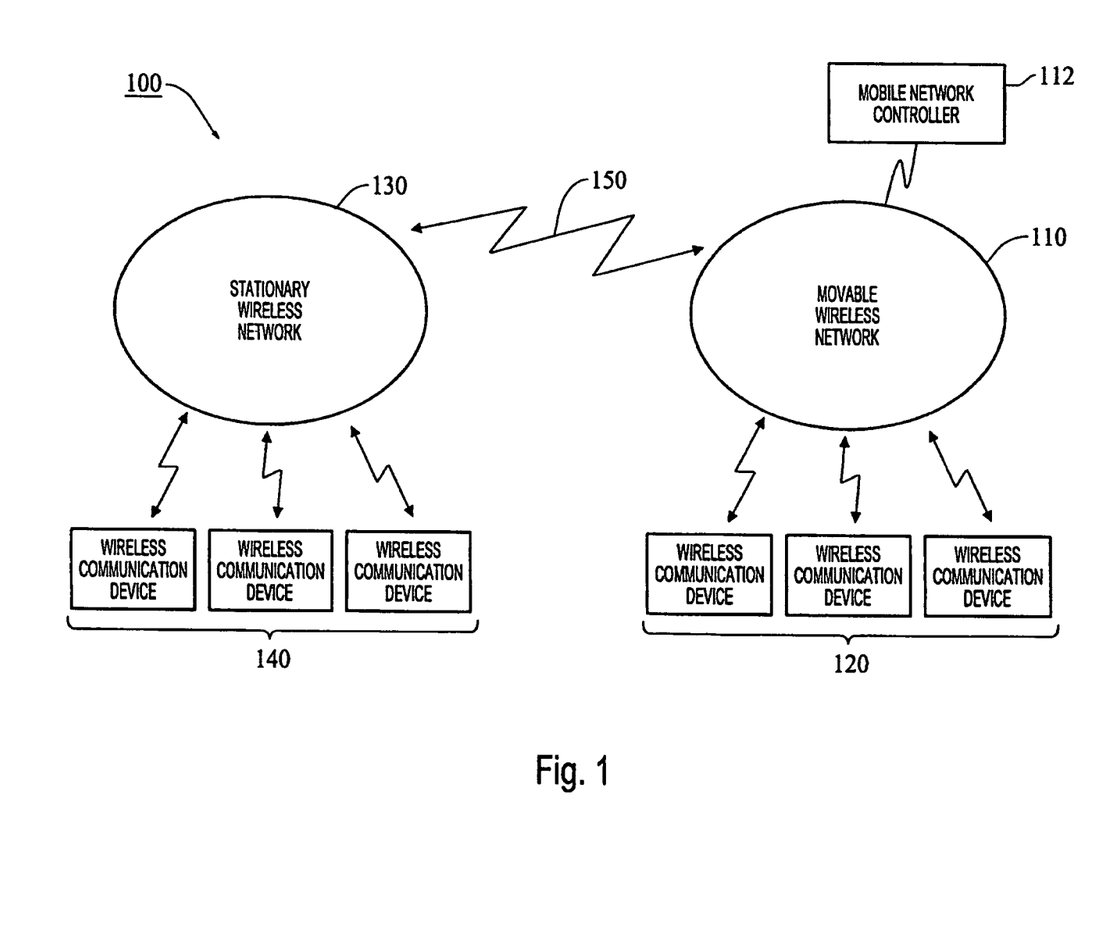
FIG. 1 is an exemplary block diagram of a communications system.

FIG. 1 is an exemplary block diagram of a communication system 100 for controlling the operation of a movable wireless network 110. As shown, the system 100 can include a movable wireless network 110, a mobile network controller 112, wireless communication devices 120 of the movable wireless network 110, a stationary wireless network 130, and wireless communication devices 140 of the stationary wireless network 130. Additionally, FIG. 1 shows that the movable wireless network 110 can be in communication with the stationary wireless network 130 via a communication link 150.

The movable and stationary wireless networks 110 and 130, respectively, may each be a single network or a plurality of networks of the same or different types. For example, the stationary wireless network 130 may be a cell or cells of a cellular network. Any combination of networks, whether a global, national, regional, wide-area, or local area, may be used without departing from the spirit and scope of the present invention. For the purposes of discussion, it will be assumed that both the movable wireless network 110 and stationary wireless network 130 are single cells within a wireless cellular network.

The wireless communication devices 120 and 140 can be devices of any type that allow for the transmission and/or reception of communication signals. For example, the communication devices 120 and 140 can be cellular telephones, wireless computers, wireless personal digital assistants (PDAs), wireless video phones, and the like. For the purposes of the following description of the present invention, it will be assumed that wireless communication devices 120 and 140 are cellular telephones.

While the mobile network controller 112 is shown as an independent unit coupled to the movable wireless network 110, it can also be incorporated into, or may be distributed throughout the network 110. For example, the mobile network controller 112 may be made part of the various network components (not shown) employed by the network 110 which are distributed throughout the network 110. Any configuration that permits control of the movable wireless network 110 can be used without departing from the spirit and scope of the present invention.

As shown, the movable wireless network 110 and stationary wireless network 130 can be in communication with each other, either directly or indirectly, via communication link 150. The communication link 150 may be of any type of connection that allows for transmission of information. Some examples include cellular telephone connections, satellite communication, radio frequency (RF), microwave, and the like. Additionally, the communication link 150 may be wired, such as copper wire, co-axial cable, optional fiber, or some combination of wired and wireless.

The mobile network controller 112 can continuously monitor the movable wireless network 110 to determine whether a network event requires the movable wireless network 110 to change an operational state. A network event can include situations where the movable wireless network 110 moves into proximity with another network (movable or stationary) or when the movable wireless network 110 interferes with another network (movable or stationary). A network event can be detected by a sensor, such as a position sensor, that can determine the position of the movable network 130 relative to known stationary wireless networks. Further, a network event can be detected by a sensor that monitors the relevant frequency spectrum and measures frequency use and signal strength within the movable network or area surrounding the movable network to determine possible interference or overlap between the movable wireless network and another wireless network (movable or stationary).

Upon detection of a network event, the network controller 112 can change the operational state of a movable wireless network 110, such as changing an output power level (including shutting down) and transmission frequencies to minimize or avoid interfering with the stationary wireless network 130. Additionally, other operational states that the mobile network controller 112 can change include codes of the system, such as mobile network codes (MNC) and mobile country codes (MCC) to correspond to a particular area of operation, a legal entity's license, or a country's jurisdiction.

As one example of operation, upon detection of a network event, the mobile network controller 112 can communicate with the stationary wireless network 130 to determine whether it is compatible with the movable wireless network 110. Such a communication can occur via communication link 150. For example, two or more networks can be compatible with each other if they are owned and/or operated by the same company, legal entity, or a company with reciprocating rights of use. In such a case, the mobile network controller 112 can coordinate the operation of the movable wireless network 110 so that the stationary wireless network 130 and the movable wireless network 110 are merged together to effectively operate as a single wireless network. In such a merged or combined network formation, the movable wireless network 110 will be configured to seamlessly operate with the stationary wireless network 130. Under such coordinated operation, the movable wireless network 110 would not interfere with the stationary wireless network 130, even though the coverage of the movable wireless network 110 could well overlap with the coverage of the stationary wireless network 130.

In such a situation the movable wireless network 110 can extend the coverage of the stationary wireless network 130, or the movable wireless network 110 can be completely within the coverage area of the stationary wireless network 130. In either situation, the users of the wireless communication devices 120 of the movable wireless network 110 would enjoy uninterrupted service from either the stationary wireless network 130 or the movable wireless network 110.

Figure 2:
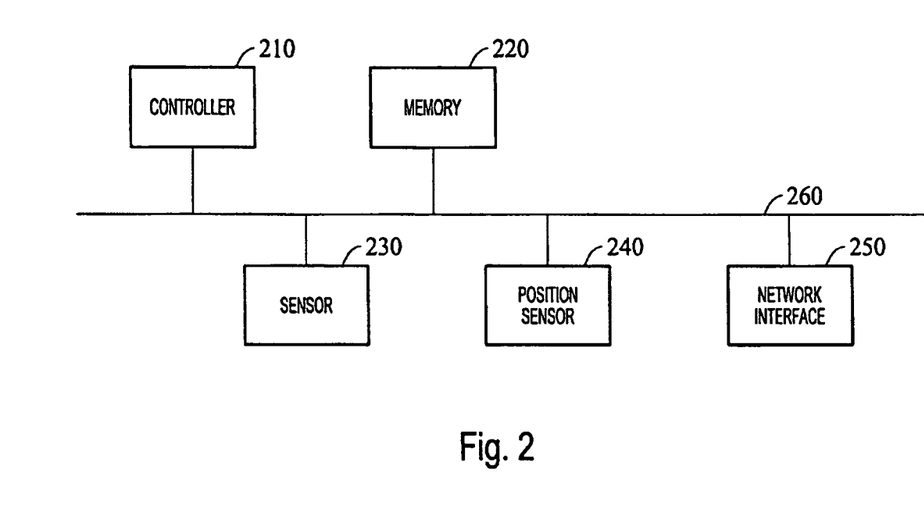
FIG. 2 is an exemplary block diagram of a movable wireless network controller.

FIG. 2 is an exemplary block diagram of a mobile network controller 112. The mobile network controller 112 can include a controller 210, a memory 220, a sensor 230, a position sensor 240, and a network interface 250. The above components are coupled together via a control/data bus 260. The above architecture of the components is exemplary only. Other architectures of the components may be used without departing from the spirit and scope of the present invention.

The memory 220 can be any device that is capable of storing data and/or instructions for operating the controller 210, movable wireless network 110, and/or any components thereof. For example, the memory 220 may be magnetic, optical, electrical read only memory (ROM) or random access memory (RAM). Additionally, the data stored in the memory can be used by the controller 210 to compare measured data, such as data measured by the sensor 230 or position sensor 240, with that data stored in the network to determine whether a network event has occurred, or how to change an operational state of the movable wireless network 110.

Sensor 230 can be any device that is capable of detecting the presence of another wireless network. For example, the sensor 230 may be an antenna, or an array of antenna that can detect wireless communications in the relevant RF spectrum. Additionally, the sensor can sense the frequency, power, and phase of signals from a wireless network or another movable wireless network.

The position sensor 240 can be any device that is capable of determining a position of the movable wireless network 110. The position sensor 240 may be an independent unit as shown, or may be incorporated with the sensor 230. For example, the position sensor 240 can be a global positioning system (GPS), LORAN, gyroscope, compass, navigational system, and the like, which detect an actual position of the movable object, and thereby a position of the movable network. The location determining device 240 can also measure or detect the altitude, direction, velocity, or change in the velocity in the movable wireless network 110.

While the movable wireless network 110 is operating, the controller 210 can continually monitor the operating environment in which the movable wireless network is being operated. As described above, the controller 210 monitors to determine whether a network event has occurred. The controller 210 can monitor the movable wireless network 110, as well as the environment in which the movable wireless network 110 is operating, to detect a network event via the sensor 230 and/or the position sensor 240. Once a network event is detected, the controller 210 can change an operational state of the wireless mobile network 110 via the network interface 250. Additionally, the controller 210 can compare information gathered by the sensor 230 and/or position sensor 240 in order to compare it with data in the memory 220 to determine how the operational state of the network should be changed.

The wireless network interface 250 can be any device that permits the controller 210 to communicate with and control the movable wireless network 110. For example, via the wireless network interface 250, the controller 210 can control one or more operational states of the movable wireless network 110. The operational states can include an amount of power, the antennas that are used, an antenna direction that is used, a phase, frequency, frequency plan, mobile network codes (MNC) and mobile country codes (MCC).

The network event can indicate that the movable wireless network 110 is about to cross, is crossing, or has crossed into operating area of a stationary wireless network 130 and/or another movable wireless network. As described above, in response to the network event, the operational state of the movable wireless network 110 can be modified to merge the movable wireless network 110 with the stationary wireless network 130 in such a way that the movable wireless network 110 does not interfere with the stationary wireless network 130 or other movable wireless networks. This can be accomplished by altering an operational state of the movable wireless network 110, such as the power level, frequencies, phase, antenna, antenna direction, mobile network codes (MNC), and mobile country codes (MCC). For example, if a network event indicated that the movable wireless network 110 was coming into contact with the stationary network 130, then the controller 210 could determine whether the stationary network 130 was a commonly owned-operated network either by communication with the stationary network 130 via communication link 150, review of network data stored in the memory 220, or communication with a remote control center via satellite or other technique. If it was determined that the stationary network 130 and movable wireless network 110 were commonly owned, then the movable wireless network 110 could set its operational states so as to be the same as the stationary network 130. For example, the controller 210 could set the movable network codes (MNC) and movable country codes (MCC) of the mobile wireless network 110 to read the same as the stationary network 130. Accordingly, users of wireless devices in either network would not experience any interruption and could seamlessly switch between mobile wireless network 110 and stationary wireless network 130. Accordingly, the movable wireless network 110 and stationary wireless network 130 can be merged together to form a single seamless wireless network.

Alternatively, if the network event indicates that the movable object is about to cross, is crossing, or has crossed out of the operating area of the stationary wireless network 130 and/or another movable wireless network, the changes in the operational state of the movable wireless network 110 can be designed to withdraw the movable wireless network 110 from the stationary wireless network 130 and/or other moveable wireless networks. In other words, when a network event occurs that indicates to the controller 210 that the movable wireless network 110 is no longer in contact with a stationary network 130, then the operational state of the movable wireless network 110 can return to an optimal state of operation. For example, if a cruise ship were leaving port and entering back into international waters, the limitation, local or otherwise, on the wireless network operation would no longer exist. Accordingly, the mobile wireless network 110 would be free to operate in a less restricted operating state, and an optimal selection of power, antenna, antenna direction, phase, frequency, mobile network codes (MNC) and mobile country codes (MCC) could be selected.

A network event can be triggered by one or more of the following: location of the movable object or wireless network; velocity of the movable object; change in velocity of the movable object; direction of the moveable object; altitude of the moveable object; location of the moveable object; detected frequency of transmitted signals from the stationary wireless network; detected power of transmitted signals from the stationary wireless network; detected phase of transmitted signals from the stationary network; known frequency of transmitted signals from the stationary wireless network; known phase of transmitted signals from the stationary wireless network; known frequency portfolio of transmitted signals from the stationary wireless network; known power of signals from the stationary wireless network; and known frequency plan of transmitted signals from the stationary wireless network. Additionally, the same network events can be trigged by another movable wireless network.

Figure 3:
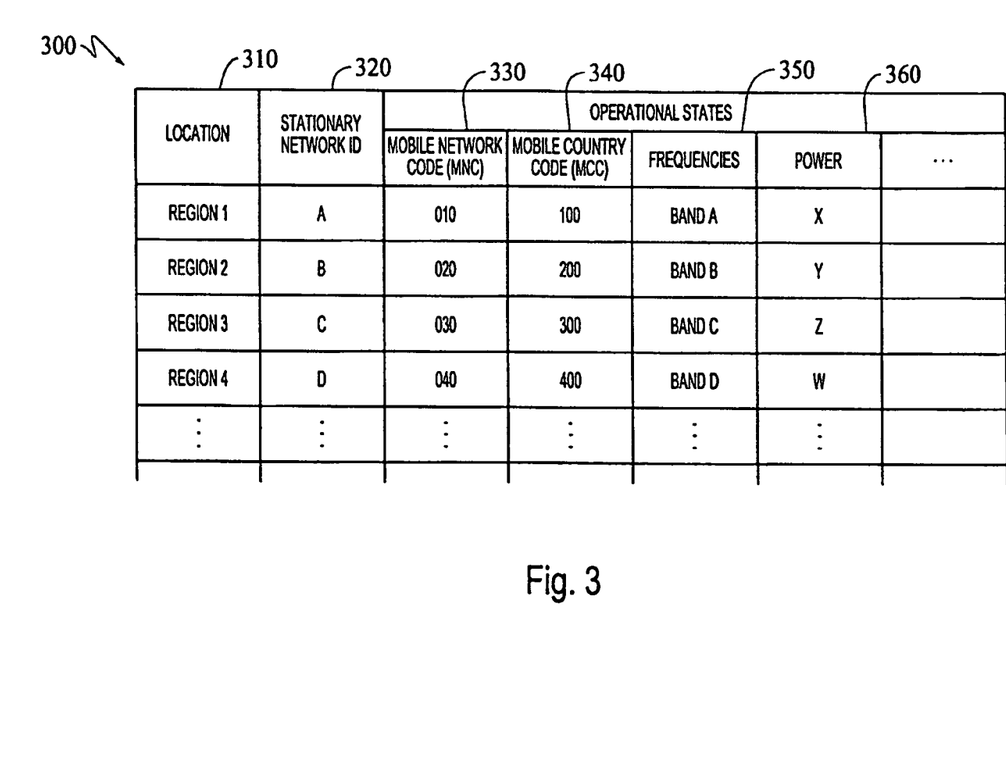
FIG. 3 is an exemplary data structure of a movable wireless network memory.

FIG. 3 shows an exemplary data structure for storing data corresponding to location related network events of the movable wireless network 110. The data structure 300 can include a field 310 for location codes and a field 320 for stationary network ID codes. Fields 330-360 are operational states corresponding to the network identified in field 320. Field 330 is the mobile network code (MNC), field 340 is the mobile country code (MCC), both of which correspond to the stationary network that is identified in field 320. Additionally, field 350 is a plurality of frequencies corresponding to the station area network ID in field 320 and field 360 is the power corresponding to the network identified in field 320.

Field 310 contains the physical location of the stationary network identified in field 320. The location of the field identified in 310 can be defined as the area covered by the stationary network. For example, in field 310, the first entry, "Region 1" can correspond to the coverage area of stationary network "A". Likewise, the location "Region 2" identified in the second row of field 310 can correspond to the coverage area of stationary network "B", identified in row 2 of field 320. These coverage areas can be RF coverage areas and/or legally defined coverage areas.

Accordingly, in operation, if the mobile controller 210 determines that a position of the movable wireless network 110 corresponds to a region stored in location field 310, then based on the exemplary data structures 300, the controller 210 will be able to determine the stationary network 130 with which the movable wireless network 110 is overlapping. For example, if a cruise ship were pulling into a port, and that port had a stationary network identified as stationary network "C" in column 3 of field 320, then as the mobile controller 210 monitored the position of the movable wireless network 110, for example, via position sensor 240, the controller 210 would determine that the position of the movable wireless network 110 was located within "Region 3", and therefore that the movable wireless network 110 would be overlapping with stationary network "C".

As described above, fields 330-360 describe the operational states of the corresponding stationary networks identified in field 320. Accordingly, in the above example, based on the knowledge that the movable wireless network 110 was operating in "Region 3", the controller 210 would be able to determine the operational states corresponding to stationary network C. For example, the mobile network code (MNC) of stationary network C is "030". The mobile country code (MCC) of the stationary network C is "300". The frequencies used by stationary network C are identified as "Band C." The power utilized by stationary network C is identified as "Z" in field 360. Accordingly, the movable wireless network 110 under the control of the mobile controller 210 could change the operational state of the movable wireless network 110 in order to co-exist with the stationary network C within the same operating environment.

Figure 4A:
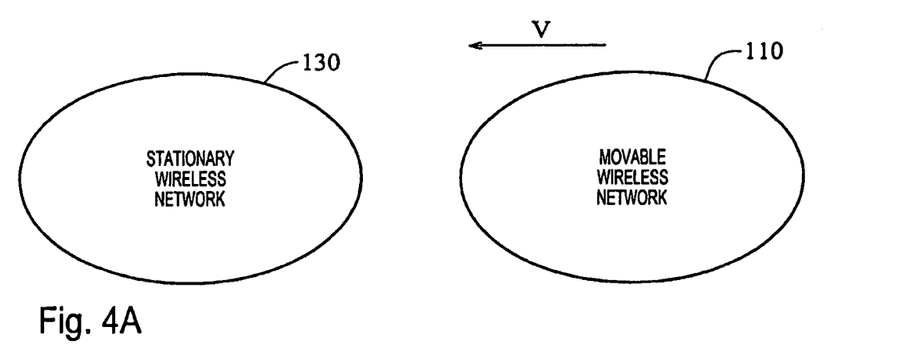
FIG. 4A is an exemplary embodiment of a stationary wireless network separate from a movable wireless network.

FIG. 4A shows an example where a moveable wireless network 110 is approaching a stationary network 130 at a velocity V. While the networks are separated from each other, the movable wireless networks 110 could be free to operate at whatever frequency, power levels, mobile network code (MNC) and mobile country code (MCC), that the network wishes to best service its wireless device users. The stationary wireless network 130 would operate at its prescribed operational state in accordance with any licenses it was granted to operate, as well as any regional, or local wireless network communicating regulations.

Figure 4B:
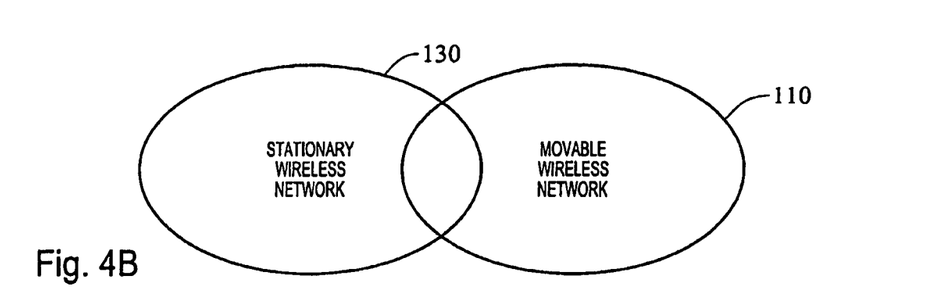
FIG. 4B is an exemplary embodiment of a stationary wireless network merging with a movable wireless network.

However, as shown in FIG. 4B as the moveable wireless network continues to approach the stationary network 130, the coverage from the moveable wireless network begins to overlap with that of the stationary network 130. As described above, this triggers a network event, whereby the moveable wireless network 110 can change the operational state of the moveable wireless network in order to avoid interfering with the stationary network 130. As also described above, the network event can be sensed by the sensor 230 when it detects the existence of another wireless network, such as communications in the relevant spectrum. Additionally, the network event can be determined by the controller 210, memory 220 and position sensor 240 when the location of the movable wireless network 110 corresponds to a known coverage area of a stationary wireless network 130. Further, as described above, the moveable wireless network 110 can adjust its power, antennas, phase, frequency, mobile network codes and mobile country codes in order to avoid interfering with the stationary network 130.

Figure 4C:
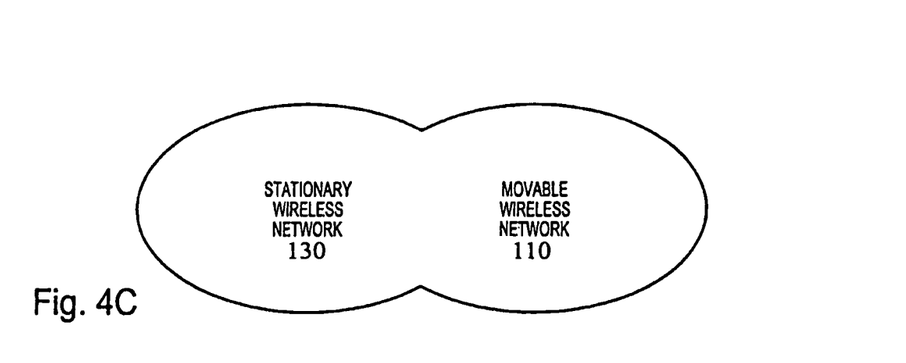
FIG. 4C is an exemplary embodiment of a movable wireless network merged with a stationary wireless network.

As shown in FIG. 4C, once the mobile wireless network 110 has changed its operational state, the mobile wireless network 110 can then become part of the stationary wireless network 130, whereby users of either the movable wireless network 110 or stationary wireless network 130 can seamlessly pass between networks with uninterrupted service. As described above, the movable wireless network 110 and stationary wireless network 130 can be merged together by, for example, changing the codes, such as mobile country codes and mobile network codes, to be the same as those of the stationary wireless network.

In order for the movable wireless network 110 to communicate with the stationary wireless network 130, the movable wireless network 110 must be able to change its operational state including but not limited to the transmission frequency, frequency plan, phase, mobile network codes, mobile country codes, type of antenna, antenna direction, power, overall system power, and power of portions of the system to meet the specific rules (based on local law, international law, treaty, bilateral or multilateral agreements) governing how, how much and where the movable wireless networks 110 can be used. Accordingly, the exemplary embodiments of this invention are required to change the operational state (conditions) of the movable wireless network 110 when necessary to comply with the rules respective to a particular scenario that the movable wireless network 110 may encounter in its normal course of use.

For example, this system can be used to change codes respective to a particular area of operation, a legal entity's license or a country's jurisdiction such as mobile network code (MNC) and mobile country code (MCC). The specific rules governing where, and what and how much power and/or frequency the movable wireless network can use can be stored in memory 220 or hardwired into the movable wireless communication network 20. By accessing the memory 220, for example, the movable wireless network can compare detected or measured data with predetermined data stored in memory 220 to detect an event, which would cause the controller 200 to change the operational state of the movable wireless network 20 to merge with the stationary wireless network 30 or withdraw from the stationary wireless network 30. By operating in this manner, multiple networks either stationary or movable may continue to operate and coordinate their operational state such that interference can be alleviated or eliminated.

Figure 5:
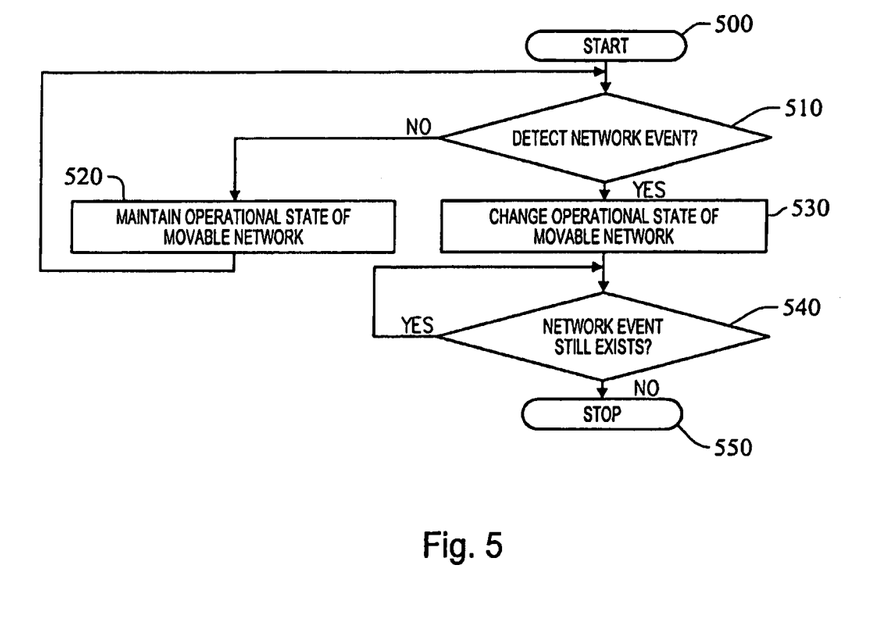
FIG. 5 is a flow chart showing an exemplary process according to the present invention.

FIG. 5 is a flowchart showing an exemplary process of controlling a mobile wireless network. The process begins in step 500 where control passes to step 510.

In step 510, the environment of the movable wireless network is monitored to determine whether a network event has occurred. If a network event has occurred, the process proceeds to step 530; otherwise, if a network event has not occurred then the process proceeds to step 520.

In step 520, the operational state of the movable wireless network is maintained. Additionally, adjustments to the operational state of the wireless network may be made to maintain a best level of service for wireless communication devices using the mobile wireless network. In any event, the process returns to step 510, where the network environment is continually monitored for the existence of a network event.

In step 530, a network event has been detected, and the operational state of the movable wireless network is adjusted. The operational state of the movable wireless network can be changed so that the movable wireless network can become part of a stationary network. Accordingly, the movable wireless network will not interfere with the operation of a stationary wireless network.

Control then proceeds to step 540 where it is determined whether the network event still exists. If yes, then the process continues to loop back to 540 until the network event ends. If the network event no longer exists, then the process proceeds to step 550 where the process ends.

While this invention has been described in conjunction with the exemplary embodiments outlined above, various alternatives, modifications, variations, improvements, and/or substantial equivalents, whether known or that are or may be presently unforeseen, may become apparent upon reviewing the foregoing disclosure. Accordingly, the exemplary embodiments of the invention, as set forth above, are intended to be illustrative, not limiting. Various changes may be made without departing from the spirit and scope of the invention.

What is claimed is:

1. A movable wireless network comprising one or more wireless communication devices, the movable wireless network further comprising:
   a detector configured to detect a network event; and
   a controller configured to change an operational state of the movable wireless network by changing at least one of a mobile country code and a mobile network code of the movable wireless network to be the same as that of another wireless network, responsive to detection of the network event by the detector, the changed operational state corresponding to a state of coordinated operation as a single wireless network of the movable wireless network and the other wireless network, the coordinated operation including continued operation of the movable wireless network and the other wireless network in a merged network formation.

2. The movable wireless network as recited in claim 1, wherein the detector detects the network event by sensing at least two of a power, phase, frequency, interference, frequency plan, frequency portfolio, mobile network code and mobile country code of the other wireless network.

3. The movable wireless network as recited in claim 1, wherein the controller changes the operational state of the movable wireless network by changing at least two of a power, antenna selection, antenna direction, phase, frequency, frequency plan, mobile network code, and mobile country code of the movable wireless network.

4. The movable wireless network as recited in claim 1 further comprising a position sensor of at least one of a global positioning system (GPS), LORAN, compass, gyroscope, and altimeter, the position sensor for determining the position of the moveable wireless network for comparison by said controller with stored other wireless network position data.

5. The movable wireless network as recited in claim 1, wherein the controller changes the operational state of the movable wireless network when the network event occurs at least partially based on other wireless network data stored in memory, said network data stored in the memory comprising position data representing coverage area and physical location for each of a plurality of stationary wireless networks.

6. The movable wireless network as recited in claim 5, wherein said network data stored in the memory further includes operational mode information of stationary wireless networks.

7. The movable wireless network as recited in claim 6, wherein the operational mode information of the stationary wireless networks includes at least one of an owner, operator, mobile network code and mobile country code of the stationary wireless network.

8. A movable wireless network comprising one or more wireless communication devices, the movable wireless network further comprising:
   a detector configured to detect a network event by sensing at least two of a power, phase, frequency, interference, frequency plan, frequency portfolio, mobile network code and mobile country code of another wireless network; and
   a controller configured to change an operational state of the movable wireless network, responsive to detection of the network event by the detector, the changed operational state corresponding to a state of coordinated operation as a single wireless network of the movable wireless network and the other wireless network, the coordinated operation including continued operation of the movable wireless network and the other wireless network in a merged network formation,
   wherein the controller changes the operational state of the movable wireless network when the network event occurs based on operational mode information of another wireless network received from the other wireless network, said detector detecting communications in a relevant spectrum of the other wireless network and the change in operational state including a change of at least one of a mobile country code and a mobile network code to be the same as that of the other wireless network.

9. The movable wireless network as recited in claim 1, the movable wireless network being located on one of a ship, car, truck, bus, aircraft or train, the movable network approaching the other wireless network at a non-zero velocity, the movable wireless network further comprising a detector for detecting the network event by detecting communications in a relevant spectrum of the other wireless network.

10. The movable wireless network as recited in claim 1, a wireless communication device of said moveable wireless network receiving uninterrupted service before and after said network event.

11. The movable wireless network as recited in claim 1, wherein the other wireless network is a stationary wireless network comprising one or more wireless communication devices, a wireless communication device of said stationary wireless network being capable of communicating with a wireless communication device of said moveable wireless network after said network event.

12. The movable wireless network as recited in claim 1, wherein the other wireless network is a movable wireless network comprising one or more wireless communication devices, a wireless communication device of said other wireless movable network being capable of communicating with a wireless communication device of said moveable wireless network after said network event.

13. The movable wireless network as recited in claim 1, wherein the network event includes detection of an overlap of the coverage area of the movable wireless network and the coverage area of the other wireless network.

14. The movable wireless network as recited in claim 1, wherein the controller is configured to change, in response to another network event, the operational state of the movable wireless network from the coordinated operation as a single wireless network of the movable wireless network with the other wireless network to independent operation of the moveable wireless network and the other wireless network.

15. The movable wireless network as recited in claim 1, wherein the controller is configured to change, in response to a network event, the operational state of the movable wireless network to reduce interference with the other wireless network prior to configuring the operational state of the movable wireless network for the coordinated operation with the other wireless network.

16. The movable wireless network as recited in claim 1, wherein the network event includes detection of the movable wireless network leaving the coverage area of the other wireless network.

17. The movable wireless network, as recited in claim 1, wherein the controller is configured to change the operational state of the movable wireless network only when the movable wireless network is compatible with the at least one other wireless network.

18. The movable wireless network, as recited in claim 1, wherein the coordinated operation extends the coverage area of the at least one other network.

19. A method comprising:
coordinating operation of a movable wireless network and at least one other wireless network to operate as a single wireless network, in response to a network event, by configuring-an operational state of the movable wireless network by configuring at least one of a mobile country code and a mobile network code of the movable wireless network to be the same as that of the at least one other wireless network, the coordinating operation including continued operation of the movable wireless network and the at least one other wireless network in a merged network formation.

20. The method as recited in claim 19, further comprising storing, in a memory of the movable wireless network, position data including a coverage area and network data associated with each of a plurality of other wireless networks.

21. The method as recited in claim 19, further comprising: detecting the network event at least partially based on data sensed by a mobile network controller associated with the mobile wireless network.

22. The method as recited in claim 21, further comprising: determining the operational state at least partially based on the sensed data.

23. The method as recited in claim 19, further comprising: changing, in response to a second network event, the operational state of the movable wireless network to an operational state corresponding to operation of the moveable wireless network independent from the at least one other wireless network, thereby withdrawing the movable wireless network from the coordinated operation as the single wireless network of the movable wireless network with the other wireless network.

24. The method as recited in claim 19, further comprising: changing, in response to a network event, the operational state of the movable wireless network to an operational state that reduces interference with the other wireless network, prior to coordinating the operational state of the movable wireless network with the operation with the other wireless network.

25. An apparatus comprising:
means for detecting a network event associated with a movable wireless network and at least one other wireless network; and means for coordinating operation of the movable wireless network and the at least one other wireless network by configuring an operational state of the movable wireless network by changing at least one of a mobile country code and a mobile network code of the movable wireless network to be the same as that of the other wireless network in response to the network event, wherein, when the network event is overlapping coverage areas of the movable wireless network and the other wireless network, the movable wireless network is configured to operate in coordination with the other wireless network as a single wireless network including continued operation of the movable wireless network and the at least one other network in a merged network formation.

26. The apparatus, as recited in claim 25, wherein, when the network event is withdrawal of the movable wireless network from the coverage area of the other wireless network, the movable wireless network is configured to operate independent from the other wireless network.

27. The movable wireless network, as recited in claim 1, wherein the operational state of the movable wireless network is changed to be the same as a corresponding operational state of the at least one other wireless network.

28. The method, as recited in claim 19, wherein the operational state of the movable wireless network is changed to be the same as a corresponding operational state of the at least one other wireless network.

29. The apparatus, as recited in claim 25, wherein the operational state of the movable wireless network is changed to be the same as a corresponding operational state of the at least one other wireless network.

* * * * *

UNITED STATES PATENT AND TRADEMARK OFFICE
CERTIFICATE OF CORRECTION

PATENT NO.       : 8,503,990 B2
APPLICATION NO.  : 11/877795
DATED            : August 6, 2013
INVENTOR(S)      : Scott A. Mountney et al.

It is certified that error appears in the above-identified patent and that said Letters Patent is hereby corrected as shown below:

In the Claims

In column 10, line 41, please remove "movable";

In column 11, line 11, please replace "configuring-an" with --configuring an--.

Signed and Sealed this
Twenty-fourth Day of September, 2013

Teresa Stanek Rea
*Deputy Director of the United States Patent and Trademark Office*